United States Patent [19]

Rhee

[11] Patent Number: 4,647,328
[45] Date of Patent: Mar. 3, 1987

[54] PROCESS FOR MAKING BELTED TIRES FREE OF UNDERTREAD CEMENTS

[75] Inventor: Chong-Kon Rhee, Broadview Heights, Ohio

[73] Assignee: The Uniroyal Goodrich Tire Company, Akron, Ohio

[21] Appl. No.: 592,170

[22] Filed: Mar. 22, 1984

[51] Int. Cl.$^4$ .................. B29D 30/08; B29D 30/16
[52] U.S. Cl. .................. 156/128.1; 152/209 R; 524/300; 524/526; 525/132
[58] Field of Search .................. 525/132, 236, 231; 156/111, 123, 128.1; 524/52 C, 540, 300; 152/209 R

[56] References Cited

U.S. PATENT DOCUMENTS 4,465,807  8/1984  Giller et al. .................. 156/110.1
4,473,427  9/1984  Irie .................. 156/128.1

Primary Examiner—Allan M. Lieberman
Attorney, Agent, or Firm—Harry F. Pepper, Jr.; Alfred D. Lobo

[57] ABSTRACT

A process is disclosed for economical mass production of radial and bias/belted tires which eliminates undertread cements and solves chronic factory tack problems by providing a synthetic rubber-based undertread compound containing predominant amounts of cis-polybutadiene and having unique tack retention properties. The building tack is optimized by use of a special mixture of a p-t-alkylphenol-formaldehyde tackifying resin, a tri-methyl-dihydroquinoline polymer, and a N,N'-disubstituted-p-phenylenediamine. The process utilizes standard factory equipment with simple modifications and requires new formulations and special prodecures during mixing and processing to minimize the amount of zinc oleate, to convert virtually all of the fatty acids to zinc salts, principally stearates, and to minimize diffusion and migration of zinc stearate in a direction toward the undertread surface. High velocity jets of air directed upwardly between adjacent shrink rolls, and water sprays are directed upwardly through openings in the conveyor belts as the dual-layer tread strip moves from the extruder to the cooling tank.

10 Claims, 6 Drawing Figures

PROCESS FOR MAKING BELTED TIRES FREE OF UNDERTREAD CEMENTS

BACKGROUND OF THE INVENTION

The present invention relates to an improved process for manufacturing radial and bias/belted tires which eliminates the use of undertread cement.

In the tire industry the tack of uncured rubber compounds has always been one of the most important properties required for building tires. Tack may be defined as the ability of two uncured rubber materials to resist separation after bringing their surfaces into contact for a short time under a light pressure.

It is important that the components of the tire exhibit quick-grab tack when building the tire; and the tack bonds should have long term resistance to separation, because the green tire may be hung on a rack for a few days before vulcanization. In addition the bonded portions of the uncured tire must have adequate green strength so that there is no excess distortion or creep before curing and no tear during the expansion that occurs upon molding (or in the second stage for a radial tire).

In factory tire manufacturing operations lack of adequate building tack has always been a problem and undertread cements and/or solvents have always been used to assure adequate tack during building of a green tire and to minimize the number of defective tires. The use of hydrocarbon solvents at the tire building machine should, of course, be avoided because of excessive cost and the fire and health hazards.

For many decades the tire industry has employed tread cements compounded to provide optimum tack and tack retention characteristics and has considered them essential to assure safe, anomaly-free tires and to maintain adequate safety standards. The need for tread cements was critical, particularly during the last decade in the manufacture of modern belted radial tires designed to operate safely at very high speeds under the severest conditions.

Even when using the best undertread cements, tire manufacturers have had frequent problems in assuring adequate building tack and have had to scrap large numbers of treads or green tires due to tire building problems and defective bonds between the undertread and the underlying belt compound and/or sidewall stock. In steel-belted radial passenger tires, for example, building tack is a particularly serious matter because of the nature of the belt compound in which the wires are embedded. Such belt compound has notoriously poor tack because of its stiffness (i,e., a 300% modulus of about 2300 psi), the relatively large amount of HAF carbon black and the relatively small amount of oil.

Safety standards with respect to radial and bias/-belted tires have been continually increasing over the years, and extensive research has been carried on during the last decade in an attempt to reduce the number of tires with defects in the vicinity of the undertread and to improve the reliability of the adhesive bond between the undertread and the belt compound and/or the sidewall stock. The tire industry has made a strong effort to produce radial and bias/belted truck and passenger car tires at reasonable cost while maintaining high safety and quality standards.

Tire manufacturers have adopted generally standard and well-accepted procedures for mass production of tires which involve use of dual-layer extruded treads having undertreads which are adhered by an undertread cement to the high-modulus belt coat compounds. These factory procedures require good tack and tack retention to permit reliable economical tire building. Therefore, it has been absolutely necessary to employ undertread cements.

Modern radial and bias/belted passenger car tires must be designed to provide good crack and abrasion resistance, low hysteresis, low rolling resistance, and good gas mileage as well as long service life and therefore employ blends of SBR and BR rubber in both the tread cap and the undertread. A typical extruded undertread produced by standard prior art factory processes and containing about 50 phr of BR rubber and about 30 phr of SBR rubber has inadequate tack to permit tire building in the absence of undertread cements, even when compounded to provide optimum tack. This is one reason that it has heretofore been impossible to mass produce belted radial passenger car tires without employing undertread cements to provide the essential building tack.

The exposed surface of an undertread (to which the cement is applied) normally contains a wide variety of different compounds which can have an adverse effect on tack and tack retention. These include sulfur; zinc stearate, calcium stearate and other calcium and zinc salts; stearic acid, palmitic acid and other unreacted fatty acids; antioxidants; vulcanization accelerators; retarders; waxes,; etc. These also include compounds produced or modified by oxidation or ozone attack on the surface (see *Rubber Chem & Tech,* 52 823, 1979). The compounding ingredients which are not dissolved in the rubber tend to diffuse and migrate to the surface so that their concentration at the surface is much higher than that of the interior rubber portions. Oxidation, degradation, bloom and contamination affect tack and adhesion and are typical of problems encountered in tire building. They involve many different reactions which are not fully understood by rubber compounders, but these problems and the problems of wax bloom and sulfur bloom have confronted the art for over 30 years, and the normal factory procedures have for many years controlled the problem well enough to permit economical mass production of belted radial passenger tires of the highest quality. Such production was achieved only because of the building tack provided by undertread cements, and, prior to the present invention, the tire industry was not aware that it could be achieved without such cements and did not appreciate the importance of eliminating undertread cements.

Heretofore rubber compounders have not been concerned about the degree of unsaturation of $C_{16}$–$C_{18}$ fatty acids sold under the name "stearic acid" and have routinely employed fatty acid mixtures containing from 25 to 50% by wt of oleic acid. In some instances, mixtures containing high proportions of oleic acid were preferred to minimize problems due to calcium stearate bloom.

Because rubber compounders heretofore were not fully aware of and concerned about the effects of various compounding ingredients on the tack and surface characteristics of extruded rubber treads, it was common practice to employ ingredients which significantly interfere with tack and tack retention. For example, it was common to employ excessive amounts of ingredients which can adversely affect the surface due to diffusion or migration, such as cyclohexyl-n-thiophthalimide, diphenyl-p-phenylenediamine and wax and other antiozonants.

Heretofore the standard equipment in a tire factory for processing treads for radial tires included a takeaway belt conveyor for moving the dual-layer tread strip from the extruder to the so-called "shrink rolls," a conveyor for moving the tread strip past a weighing station, and a cementing station with rolls for receiving and supporting the strip while applying the undertread cement. It is necessary to support the tread strip with the tread cap in the top position and to keep the conveyor belts and the undertread surface dry and free of water until the weighing and cementing operations are completed.

In a typical plant the tread strip travels 50 to 60 feet (ft) from the extruder to the cementing station and is then carried 20 to 60 ft or more to a large cooling tank containing belt conveyors arranged in several tiers to support a tread strip with a length of several hundred ft. A large number of water sprays are provided in the tank above each section of the belt conveyor to direct water sprays down against the tread cap. The water spray provides a high rate of heat transfer; but, because of the notoriously poor heat conductivity of rubber, each portion of the tread strip leaving the extruder at 120° C. may remain at a temperature above 95° C. for several minutes depending on the rubber thickness and the rate of extrusion which for some treads is below 60 ft/min.

In a typical plant, each portion of the tread strip travels about 200 ft to the second tier of the cooling tank before there is rapid cooling of the undertread by the water sprays. During such travel, which usually takes several minutes, the surface temperature of the undertread is considerably higher than that of the tread cap. The water which is applied to the conventional conveyor belts carrying the cemented tread strip to the cooling tank has a cooling effect, but such incidental cooling of the undertread does not reduce the surface temperature significantly.

The normal tread cooling procedures of the type described above have been used for more than a decade. They cause the surface of the undertread to remain hot longer than the outer surface of the tread cap and promote undesirable diffusion and migration of zinc stearate and other ingredients to the undertread surface. The tire industry did not recognize this and did not understand how the standard procedures or slow extrusion rates could adversely affect building tack. Also the rates of extrusion were limited by the nature of the existing equipment and the cooling capacity of the cooling tank. Such limitations in existing factories, the cost of equipment and other practical considerations prohibited major changes in the procedures for extruding and cooling the treads.

The prior art procedures were such that undertread cements were essential to obtain adequate building tack, and those skilled in the art did not see a reason to change those procedures and had no reason to believe that it was feasible to eliminate the undertread cement in the standard factory process. For example, a change in a conventional cooling tank to increase the rate of cooling from 10 to 20% would be prohibitive because of cost and ineffective because applied in the wrong place and too late to have any effect on tack. Prior to this invention the tire industry saw no way to save significant amounts of money in manufacturing its tires by investment in new cooling equipment.

SUMMARY OF THE INVENTION

The present invention involves a breakthrough in the art of building radial and bias/belted tires because of the enormous reduction in manufacturing costs and makes it possible to improve tire quality significantly by use of adhesive-free bonding at the undertread.

The process of this invention requires a substantial number of changes in normal factory practices and significant changes in the procedures and equipment for cooling the rubber compound during and after processing. However, major investment in new equipment is not required because the invention is essentially an improvement in the basic factory tire manufacturing process and can be practiced in existing tire manufacturing plants using conventional compounding ingredients and standard processing equipment including first-stage and second-stage Banbury mixers; calenders, extruders, shrink rolls, cooling tanks, etc.

Although the advantages of the present invention cannot be obtained merely by modifying the recipe for the undertread composition, it is essential that a special recipe be employed which is capable of providing adequate building tack when processed according to my new method. The rubber selected for the undertread composition is an NR/BR/SBR blend containing a substantial proportion, such as 25 to 35 phr, of natural rubber and a large proportion, such as 40 to 60 phr, of cis-BR rubber.

In selecting compounding ingredients it is important to limit the amounts of certain migratory additives, such as retarders and antidegradants, particularly cyclohexyl-n-thiophthalimide and diphenyl-p-phenylenediamine, and to minimize the need for retarders by use of non-scorching sulfenamide accelerators.

Complete success in practicing the invention without undertread cements requires that the undertread, belt and sidewall compounds have good and uniform tack and be processed in such a manner that the tack is retained until the cut tread reaches the tire building machine.

In order to provide the undertread with adequate tack and tack retention characteristics, it is necessary to optimize the tackifying system by employing from 4 to 10 phr of a special mixture of (a) an alkylphenol tackifying resin, (b) a polymeric dihydroquinoline, and (c) an N,N'-disubstituted-p-phenylenediamine, each being present in a ratio from 1:1 to 3:1 with respect to each of the other constituents and in a limited amount preferably not in excess of 4 phr. It is also necessary to limit the amount of oleic acid in the undertread composition to a small amount (i.e., less than 0.1 phr), to add substantial amounts of stearic acid (i.e., 1 to 2 phr) and substantial amounts of zinc oxide (i.e. 2 to 5 phr), and to cause complete reaction of the fatty acids with zinc oxide to convert the same to the corresponding zinc salts (e.g., zinc stearate).

Such complete conversion cannot be accomplished except at high temperature, and a large stoichiometric excess of zinc oxide can be employed to speed up the reaction. In the practice of the invention, it becomes necessary to heat the rubber compound in the first-stage Banbury mixer to a temperature of from 160° C. to 180° C. before it is dumped.

In accordance with the invention, the normal factory process is modified and controlled to overcome problems caused by the zinc stearate, zinc palmitate, and other zinc salts formed in the undertread composition during the high-temperature first-stage mixing. The second-stage Banbury mixer is operated to maintain the rubber temperature below 105° C. during mixing, and the rubber compound leaving the mixer is cooled to a temperature below 70° C. in less than one minute (1 min) before it enters the extruder.

In building steel-belted radial tires in the preferred process of this invention, the rate of discharge of the dual-layer tread strip from the extruder is increased to the range of from 90 to 120 ft/min or higher and the extruder is cooled to limit the maximum temperature of the rubber compound in the extruder to the range of from 110° to 120° C. Improved results are obtained when such maximum temperature is no greater than 115° C.

The undertread and the tread cap are extruded simultaneously and joined together in the usual manner at the extruder to form the dual-layer tread strip which is carried by the take-away conveyer and the shrink rolls past a weigh station to a water-cooled belt conveyor which feeds the tread strip toward the cooling tank.

The high temperature of the rubber compound leaving the extruder presents a problem because the zinc stearate and similar zinc salts diffuse at such temperature and tend to migrate to the surface in a short period of time. The problem is a difficult one because the tread is too thick to be cooled rapidly. A special cooling procedure is critically necessary to assure that the undertread surface retains adequate building tack.

The present invention solves the problem in a simple and effective manner without expensive equipment by rapidly cooling the undertread side of the tread package to a temperature at least 10° C. below that of the tread cap side so to promote migration of the zinc salts away from the undertread surface rather than toward that surface as in the prior art process. Such cooling is initiated within 40 seconds (sec) and preferably within 30 sec after the rubber compound leaves the extruder.

In a preferred embodiment of the invention, the dual-layer tread strip from the extruder passes over a series of shrink rolls, each being spaced from the next roll to provide an unobstructed opening to the surface of the undertread; and fans or blower means are provided to deliver high-velocity cooling air upwardly through such openings and cause the air to impact against the undertread surface. Although the rate of cooling which can be provided with air is less than that which can be provided by water sprays, the prompt cooling by air is remarkably effective, especially when followed in 10 to 30 sec by direct water cooling of the undertread surface.

In the preferred embodiment a cooling zone is provided in which the tread strip is supported on a conveyor belt having openings through which water is sprayed upwardly directly against the undertread surface to cool each portion thereof to a temperature below 40° C. in no more than 1 min after that portion leaves the extruder. The speed of movement of the tread strip is controlled so that the rubber travels from the extruder to said cooling zone in a period of time less than 40 sec.

Rapid water cooling of the rubber compound at the undertread side of the tread strip for 10 to 30 sec or more before such compound reaches the top tier of the multi-tier cooling tank has been found to be a remarkably effective way to crystallize the zinc stearate and reduce its migration to the undertread surface.

In the preferred embodiment of the invention, the belt conveyor at the top tier of the conventional cooling tank is modified by use of a plastic belt with openings therein to expose a major portion of the undertread surface and by the addition of water below the belt to direct the water spray upwardly through the openings of the belt to the undertread surface.

It is essential that cooling be started promptly to limit the zinc stearate diffusion. For example, in the manufacture of radial passenger treads, the rate of extrusion can be increased to at least 90 ft/min to reduce the time required for the tread strip to reach the first water cooling zone and to reach the cooling tank. The high extrusion speed plus forced air cooling of the undertread surface at the shrink rolls to reduce migration of zinc stearate toward that surface provides a unique and effective combination which makes it possible to maintain building tack while retaining most of the original factory equipment.

Undertreads prepared according to this invention are unique because of their ability to retain building tack for long periods of time. After storage for 24 hr, the tack of the noncemented undertread is equal to that of conventional cemented undertreads, and in the next three days of storage the tack of the noncemented undertread is retained while that of the cemented undertread continually decreases to a dangerously low level.

An object of the invention is to reduce the cost of and improve the quality of radial and bias/belted tires by improving the surface characteristics and building tack of the undertread and the belt compound and by providing adhesive-free bonding of the undertread to the underlying belt compound and the sidewall stock.

A further object of the invention is to provide an undertread with outstanding tack retention properties.

DESCRIPTION OF THE PREFERRED EMBODIMENTS

Figure 1:
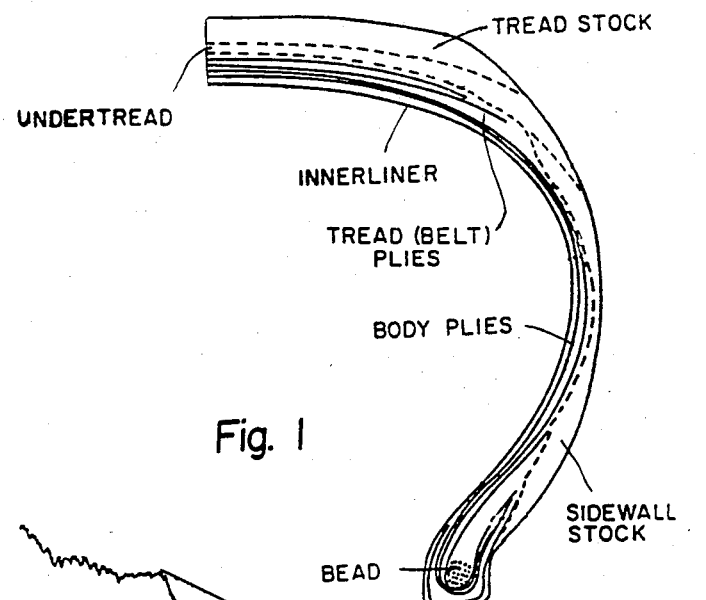
FIG. 1 is a fragmentary schematic view on a reduced scale showing the conventional construction of a belted radial passenger car tire.

The present invention relates to a process for manufacturing radial and bias/belted tires as shown, for example, in FIG. 1 and at page 47 of *Rubber World*, Vol. 174, June 1976; pp. 569–73 of *"Science and Technology of Rubber"* by F. R. Eirich, 1978; and pp. 849–52 of *Rubber Chem & Tech Vol.* 53, No. 4, 1980. The process is particularly applicable to the building of steel-belted radial passenger car tires, such as the tire shown on page 852 of the latter publication, and causes enormous reductions in manufacturing costs by eliminating the undertread cementing operations which were previously essential.

It will be understood that, unless the context shows otherwise, all amounts, percentages and proportions set forth herein are by weight and that the terms used have their normal meanings as understood in the rubber art (see ASTM STP 184, 1956).

Wherever used in this specification, the term "Mooney viscosity" refers to the viscosity number as indicated by the dial reading on a standard Mooney viscometer when using a large rotor after 1 minute of preheating followed by four minutes of shearing at 100° C.

Tires made according to the invention employ the usual dual-layer extruded tread having a tread cap integrally joined to an undertread. The tread cap stock employs a blend of 50 to 70 parts by weight (wt) of styrenebutadiene (SBR) rubber with 30 to 50 parts by wt of a cis-polybutadiene (BR) rubber to provide a tread with a optimum combination of properties including excellent resistance to wear and thermal degradation, long service life, and low rolling resistance.

The undertread composition employs a blend of natural rubber (NR), cis-polybutadiene rubber and SBR rubber compounded to provide an optimum combination of properties including low hysteresis, low rolling resistance and resistance to thermal degradation. In accordance with the invention the undertread compound is specially compounded to optimize the tackifying system and to provide good tack and tack retention properties and good green strength so that, by use of special procedures described in detail hereinafter, tires of the highest quality can be mass produced at lower cost without the use of solvents and cements on the undertread except at the tread splice.

The undertread composition of this invention employs a blend of from 25 to 40 parts by wt of natural rubber, from 40 to 60 parts of cis-polybutadiene rubber and from 10 to 35 parts of SBR rubber. The preferred blends contain from 25 to 35 parts by wt of hevea rubber, from 45 to 55 parts of cis-BR rubber and from 15 to 25 parts of SBR rubber.

The cis-polybutadiene elastomers used in the practice of the invention are preferably rubber having a raw Mooney viscosity (ML-4/100° C.) of from 30 to 80 and more preferably 35 to 65 and having a cis 1,4 content of from 90 to 99%. Such BR rubber may, for example, be of the type disclosed in U.S. Pat. Nos. 3,993,856; 4,020,255 and 4,198,496. It is preferable to employ commercial cis-BR rubbers with a high cis 1,4 content, such as 95 to 98%. Minor amounts of oil-extended BR rubber may sometimes be used. Suitable BR rubbers include Taktene 1202, 1203 or 1220; Budene 1207 or 1208, Cisdene 1203, and Diene NFA/AC.

The SBR rubber used in the tread cap and undertread stocks is of the type commonly used in tire treads. The SBR rubber used in the undertread preferably has a Mooney viscosity (ML-4/100° C.) from 40 to 80. Oil-extended SBR rubber is commonly used in the tread cap and can sometimes be used in the undertread. The fatty acid content of the SBR rubber is preferably no more than 5% by wt, but somewhat higher amounts can sometimes be tolerated if the SBR content is 25 phr or less.

The tread cap composition is compounded for high abrasion resistance and employs 40 to 80 parts by wt of a highly reinforcing carbon black, such as HAF, ISAF or GPT (general purpose tread) carbon black, per hundred parts of rubber (phr). The undertread composition is compounded for low hysteresis and building tack and employs a carbon black of greater particle size and less surface area, such as a general purpose furnace (GPF) carbon black. The carbon black employed in the practice of this invention preferably has an average particle size of from 45 to 70 millimicrons (m$\mu$), a surface area of from 25 to 60 square meters per gram (m$^2$/g) and a dibutyl phthalate absorption (DBP) of from 0.65 to 1.10 cm$^3$/g.

The specifications for carbon black and other compounding ingredients as set forth herein are those recognized in the rubber art as reported, for example, in *Blue Book*, published 1983 by Bill Communications, Inc., and "*Materials and Compounding Ingredients for Rubber and Plastics*", published by Rubber World. Specification testing may, for example, be carried out according to ASTM D2414-79; D3493-79; and D3037-78.

The undertread composition used in the practice of the invention employs from 10 to 25 phr of a process oil, part of which may be present in an oil-extended BR or SBR rubber. Any conventional oil commonly used in tread compounds is suitable including Sundex 790, Califlux SP, Circo Light, and ASTM D2226 types 101, 102 and 103.

The undertread composition of this invention employs a limited amount of a phenolic tackifying resin from 1 to 4 phr such as to provide optimum building tack when the undertread is adhered to the belt stock and the sidewall stock during tire building. When using the preferred alkyl-phenol formaldehyde tackifier, the amount is preferably from 2 to 4 phr. Such tackifier may be the same as that used in the tread splice cement disclosed in my copending U.S. patent application Ser. No. 581,512 filed Feb. 21, 1984.

The tackifying resins have a molecular weight preferably from 700 to 1500 and a general structure as follows:

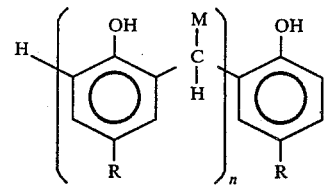

wherein M is hydrogen or a methyl group and R is a tertiary alkyl group having from 4 to about 18 carbon atoms, such as t-butyl, t-octyl or t-dodecyl; and, n is an integer in the range from 3 to about 10. The tackifying resin may be a novolak where M is hydrogen.

The tackifying resin may be formed from a para-tertiary alkyl phenol and acetylene or an aldehyde, such as formaldehyde or acetaldehyde. Good results are obtained using well known tackifiers, such as Koresin (a reaction product of para-tertiary alkyl phenol and acetylene), but phenolformaldehyde (PF) tackifying resins are preferred.

Commercial PF resins which are suitable for use in the practice of the invention include Resin 3472-30 and Arofene 8320PP (Ashland Chemicals) based on t-octylphenol; Resin SP 1077 (Schenectady Chemicals) based on t-octyphenol (epoxy-modified); Resin 187-1 and 187-3 (Ashland) based on t-dodecylphenol; and Koretack CG 5136 (BASF) based on t-octylphenol with aniline as the third monomer. These are described in *Rubber Chem and Tech.*, Vol. 55, pages 442–455.

Heretofore undertread cements have been critically necessary to assure proper building tack and essential for successful factory operations. Elimination of such undertread cements not only requires many changes in compounding and processing practices but also requires an optimization of the tackifying system using the best combination of ingredients in the undertread. The combination includes from 1 to 4 phr of the para-t-alkyl-phenol formaldehyde tackifying resin described above with a number average molecular weight from 700 to 1500, from 1 to 4 phr of a trimethyl dihydroquinoline polymer, and usually from 1 to 2 phr of a N,N'-disubstituted paraphenylenediamine (PPD) having an alkyl substituent, such as an alkyl-aryl PPD or a dialkyl PPD.

Best results are obtained using a polymerized 1,2-dihydro-2,2,4-trimethylquinoline such as Age Rite Resin D (ARRD), Flectol H or others disclosed in my aforesaid copending application.

The disubstituted PPD used in the undertread composition is preferably selected from the group consisting of N,N'-dialkyl-p-phenylenediamine, N-alkyl-N'-phenyl-p-phenylenediamine and mixtures thereof. The alkyl group may have up about 18 carbon atoms and may, for example, be an isopropyl, 1,4-dimethylpentyl, 5-methylheptyl, 1,3-dimethylbutyl or octyl group. Excellent resuls are obtained using a N-1,3 dimethylbutyl-N'-phenyl-PPD or other alkyl-aryl PPD such as Santoflex 13, Wingstay 300, UOP 588 or Vulkanox 4020. Good results are also obtained when part or all of the PPD antiozonant is a dialkyl PPD such as UOP 88 or UOP 288. It is important to avoid use of substantial amounts of diaryl PPD's; such as Wingstay 100, in the undertread.

The curatives and other compounding ingredients must be selected to avoid scorch during processing, to limit the amount of activators and retarders which have an adverse effect on building tack or tack retention and at the same time to provide excellent physical properties such a a tensile strength of at least 2500 psi and a 300% modulus of from 1000 to 1200 psi. To obtain the desired physical properties, it is necessary to employ at least 2 phr of zinc oxide and a substantial amount of zinc stearate, stearic acid or other $C_{16}-C_{18}$ fatty acids. The amount of zinc oxide should not exceed 5 phr and the amount of fatty acids is also limited to avoid bloom and adhesion problems.

Heretofore, undertread and tread cap compounds have employed substantial amounts of cyclohexyl-n-thiophthalimide to prevent scorch during processing. Limited amounts of this compound less than 0.3 phr can be employed in the undertread, but the compound is undesirable with respect to building tack and is preferably used in an amount not in excess of 0.2 phr in combination with a nonscorching accelerator. In accordance with this invention, such amount is minimized and building tack is improved by judicious selection of curatives. The undertread composition contains from 1.5 to 2.5 parts of sulfur and from 0.5 to 2 parts of nonscorching delayed-action sulfenamide vulcanization accelerators, such as those made by reacting 2-mercaptobenzothiazole (MBT) with an amine, such as t-butylamine, t-octylamine, isopropylamine, cyclohexylamine, morpholine or dimethylmorpholine (see *Rubber Chem & Tech.*, 53, 393). Suitable accelerators include Santocure NS (BBS), Santocure MOR (MTB), Dipac (DIBS), Nobs Special, Amax (OBTS), CBG (Curax, Delac S, Santocure), DCBS (N,N-dicyclohexyl-2-sulfenamide), and N-diethyl-2-benzothiazyl sulfenamide.

Heretofore fatty acids in amounts from 1 to 4 phr have been added to conventional tread compounds. These are usually mixtures containing oleic acid and saturated fatty acids with 14 to 20 carbon atoms, such as stearic acid ($C_{18}$), palmitic acid ($C_{16}$), myristic acid ($C_{14}$) or arachidic acid ($C_{20}$). Typical commercial mixtures contain from 25 to 65% by wt pf stearic acid, 5 to 50% of palmitic acid, 2 to 50% of oleic acid, up to 25% of myristic acid and minor amounts, such as 5 to 20% of lauric acid, linoleic acid and other fatty acids. The fatty acids commonly used by tire manufacturers and sold under the name "stearic acid" may contain only 40 to 45% by wt of stearic acid.

As used herein the term "commercial stearic acid" refers to fatty acids of the type sold under the name "stearic acid" consisting essentially of $C_{16}-C_{18}$ fatty acids and small amounts of other fatty acids (e.g., 5 to 10%).

A commercial stearic acid may, for example, contain about 40 to 65% of stearic acid, about 10 to 50% of oleic acid, about 10 to 60% of palmitic acid and about 25% of other fatty acids.

Rubber compounders heretofore have not been concerned about variations in the degree of unsaturation of the $C_{18}$ fatty acids in commercial stearic acid or in the amount of $C_{16}$ palmitic acid because such variations have little, if any, effect on the physical properties of the cured rubber. However, some rubber compounders prefer to employ commercial fatty acids containing major amounts of oleic acid.

One of the commercial fatty acids commonly used by tire manufacturers typically contains about 45% of oleic acid, about 25% of palmitic acid, about 15% of stearic acid and about 5 to 7% of linoleic acid. One manufacturer modified its factory procedure by replacing the commercial "stearic acid" of its standard tire tread compounds with this type of high-oleic fatty acid to solve serious bloom problems due to rapid migration of stearic acid to the surface of the hot rubber during processing. For this reason oleic acid has heretofore been considered a desirable component of the "stearic acid" or other commercial fatty acid added to an undertread compound used in radial tires.

It is true that oleic acid can solve certain bloom problems because it reacts more readily with zinc oxide at the temperatures normally encountered in the manufacturing process to form the zinc salt. It is also true that oleic acid ($C_{18}$), like stearic acid, can provide a cured rubber with the excellent physical properties required in a modern radial tire.

I have discovered, however, that, when special procedures are followed as described hereinafter, tack problems at the undertread of a conventional radial tire can be solved and that the need for undertread cements can be eliminated provided that the fatty acids in the undertread composition contain a high proportion of stearic acid and only a limited amount of oleic acid.

In the practice of my invention it is preferable to employ a commercial "stearic acid" which contains 70 to 80% or more of stearic acid and less than 10% by wt of oleic acid. Stearic acid is required because of the high melting point (mp) of zinc stearate (about 120° C.), and oleic acid should be avoided because the mp of zinc oleate is below 86° C. and well below the surface temperatures encountered in the extruder. The amount of palmitic acid should also be limited because the mp of zinc palmitate (about 100° C.) is too low. Zinc stearate will melt at temperatures above 120° C. and cause serious problems due to migration to the surface of the hot rubber if temperatures are higher than 120° C. during and after extrusion, but such problems can be minimized by cooling the extrudates to maintain surface temperatures below 120° C. and by cooling the rubber stock promptly after it leaves the extruder.

In carrying out the process of this invention, it is important to consider the fatty acid contents of the various rubbers and to employ a proper blend. It is important that the rubbers used to form the NR/BR/SBR blend of the undertread composition are selected so that 100 parts by wt of the blend as initially added to the first-stage Banbury mixer contains no more than 2 parts of saturated fatty acids with up to 16 carbon atoms (ie., $C_{12}$ to $C_{16}$ acids) and no more than 0.2 part of unsaturated fatty acids with 18 carbon atoms, such as oleic or linoleic acid. The maximum amount of oleic acid in the blend is no more than 0.2 part and preferably no more than 0.1 part. The amount of stearic acid may, however, be as high as 4 phr.

In accordance with the invention, the undertread composition, which contains 25 to 40 parts of natural rubber per 100 parts by wt of rubber, is provided with from 40 to 60 parts and more preferably 45 to 55 parts of polybutadiene rubber having a cis 1,4 content of from 90 to 99% by wt and more preferably 95 to 99% by wt. The typical cis-BR rubber has a Mooney viscosity (ML-4/100° C.) in the range of from 35 to 60.

Because the cis-polybutadiene elastomers contain little, if any, fatty acids (less than 0.2 phr), the use of a major amount of this rubber makes it possible to minimize the amount of fatty acids in the rubber.

The amount of SBR rubber in the undertread is preferably in the range of from 10 to 25 phr to limit the amount of fatty acids. The fatty acid content of the SBR rubber used in the undertread may be from 5 to 6% by wt and is preferably at a somewhat lower level (i.e., 4 to 5%).

As pointed out hereinafter this invention requires that the mixing in the first-stage Banbury mixer be carried out at such a temperature and in such a manner as to convert the mixed fatty acids to zinc stearate, zinc palmitate, zinc oleate and similar zinc salts. The amount by weight of zinc stearate in the extruded undertread is limited but should be substantially greater than that of zinc palmitate and at least several times (i.e., from 3 to 10 times) that of zinc oleate.

In typical tires made prior to this invention, the zinc stearate and other zinc salts are present at the exposed surface of the extruded undertread along with calcium stearate and other calcium salts. Excessive amounts of these salts cause tack problems and interfere with sticking of the undertread to the belts and the sidewall and can cause tack problems even when the undertread is covered with a tread adhesive.

I have found a way to minimize the calcium stearate problem as explained in more detail hereinafter and a way to limit the diffusion and migration of the zinc stearate to the surface so that adequate tack and tack retention properties can be provided without use of an undertread cement. The process of the invention provides an extruded undertread wherein an average sample (as defined herein) taken at the exposed surface thereof (away from the tread cap) contains negligible amounts of unreacted fatty acids (i.e., from 0.1 to 0.2 phr or less) and contains a limited amount of fatty acid salts including nominal amounts of calcium salts, small amounts of zinc salts of oleic acid or other unsaturated fatty acids, and substantially greater amounts of zinc salts of saturated fatty acids. Said limited amount is such that the ATR infra-red absorbance band ratio $A_{1540}/A_{1375}$ determined for said average sample is no more than about 1.5 and usually much less.

The term "average sample" is used in connection with the exposed undertread surface of a dual-layer tread (FIG. 5) which extends between the opposite sidewalls (see FIG. 1) and around the circumference of the carcass and which is adhered to the sidewall stock and to the outermost circumferential belt. The average surface characteristics of said "exposed surface" can theoretically be determined by dividing the entire surface area thereof into many hundreds of 4.8 cm × 1.9 cm samples suitable for spectral or spectroscopic analysis, obtaining an ATR infrared spectrum for each sample, and determining the theoretical spectrum which is the average of all of the samples. A hypothetical sample with surface characteristics averaged in this manner is an "average sample" as that term is used in the specification and claims hereof.

A reasonable estimate as to the surface characteristics and ATR infrared spectrum for such an "average sample" may, of course, be made by spectroscopic analysis of several samples taken across the width of the exposed undertread surface because the surface conditions are usually substantially uniform along the length of the extruded tread. As shown schematically in FIG. 4, six thin 4.8 cm × 1.9 cm samples may be cut from the undertread at the "exposed surface" and used for spectroscopic analysis to estimate the average surface characteristics of the entire surface. The sample thickness is not critical and may, for example, be from 0.1 to 0.4 cm.

Figure 5:
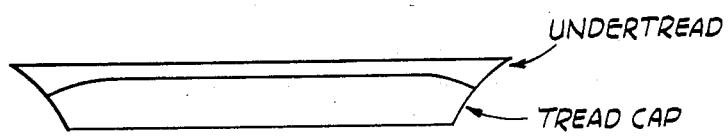
FIG. 5 is a cross-sectional view of the tread of FIG. 4.

FIG. 5 indicates generally the cross-sectional shape of an inverted dual-layer tread as is used in typical steel-belted radial tires and indicates how samples identified as 1 through 6 may be taken across the width of the tread at the exposed undertread surface remote from the tread cap. Such samples may be used to obtain ATR infrared spectra as reported hereinafter.

The surfaces of such samples are analyzed using the technique of Attenuated Total Reflectance (ATR) Spectroscopy. That technique has been commonly used for more than a decade to determine the infrared spectrum of the surface of a sample that has been placed in intimate contact with a suitable reflection element, such as a germanium crystal. This technique can be used for qualitative analysis of the surface of cured or uncured rubber, for example to determine the effects of degradation by ozone, etc. (*Rubber Chem & Tech,* 48, 41 (1975), 52, 823, 1979; *Chem. Infrared Spectroscopy,* W. J. Potts, Jr., 1963; *Applied Infrared Spectroscopy,* A. Lee Smith, 1979). As indicated in the 1979 Smith publication the ATR technique is also used to a limited extent for quantitative analysis, for example by use of peak heights or absorption band maxima. Thus the vinyl acetate content of ethylene-vinyl acetate copolymers can be monitored by comparing the ratio of the 1735 cm$^{-1}$ carbonyl absorbance to that of the 1465 cm$^{-1}$ CH band (*Appl. Spectroscopy,* 28, 477, 1974).

Measurement of the absorption intensity of one constituent relative to another provides one means of estimating the relative amounts of the two constituents because the intensity is substantially proportional to the amount present in the sample. Where the amount of one is known and reflected by a strong absorption band, band ratios may permit determination of the amount of the other constituent.

Quantitative analysis of a mixture can be performed by adding to the mixture a known amount of a compound which has at least one strong absorption band at frequencies not interfered with by other components of the mixture. The added compound is usually known as the "internal standard."

A rubber compound containing oil and a blend of natural and synthetic rubber can be analyzed using natural rubber as the internal standard because of its strong absorption band at about 1375 cm$^{-1}$ and the fact that the limited amounts of process oil with an absorption band at the same frequency for some unknown reason do not seriously affect the NR band. If a sample produces an ATR spectrum with strong absorption bands at 1578 and 1540 cm$^{-1}$ the presence of calcium stearate is suggested. Strong bands at about 1540 and 1400 cm$^{-1}$ are characteristic of zinc salts of fatty acids, such as zinc stearate, and can be used to estimate the amounts of such zinc salts relative to the amount of natural rubber.

ATR infrared spectroscopic analysis of the surface of a carbon black-loaded rubber compound using standard equipment, such as a Perkin-Elmer 180 spectrophotometer, has heretofore presented a problem. Carbon black absorbs infrared radiation and makes ATR analysis very difficult. Without a special procedure the equipment does not provide a spectra suitable for quantitative analysis. The carbon black in a tire compound sample results in a steep slope of the spectrum as the scan proceeds from high to low frequency. The penetration depth can increase by a factor of more than 5 in such a scan. Fortunately a special procedure has been found which solves this problem and makes it possible to obtain ATR spectra as shown, for example, in FIG. 2 and to carry out reliable quantitative analysis of the exposed surface of an undertread by use of absorbance band ratios.

The infrared spectra referred to herein with respect to the study of uncured tread samples was obtained using a standard Perkin-Elmer 180 Monochromator unit and the accompanying Recorder Console unit. An ATR attachment was employed consisting of a standard Harrick TPMRP-VA unit containing a 5 cm×5 cm×0.2 cm germanium crystal with 45° end angles. It was mounted on the spectrophotometer with a 45° angle of incidence at the Ge/rubber interface. That unit is designed to receive two 4.8 cm×1.9 cm samples applied to both faces of the crystal.

In ATR measurements the intensity of the spectrum depends on the extent to which the crystal surfaces are covered as well as the degree of contact between the crystal and the sample. Each of the rubber samples involved soft stocks whose surface could easily be flattened against the crystal face by finger tightening the adjustable clamping nut to obtain good and uniform contact. By tightening the nut as far as possible without damaging the crystal, excellent contact is obtained so that the results are reproducible with a reasonable degree of accuracy. However, the normal procedure does not provide an ATR spectra suitable for quantitative analysis of a tread stock because of the absorption of the light by the carbon black.

That problem is solved by using a smaller rubber sample and by applying it to one side only rather than to both sides of the germanium crystal. Instead of using the normal thin 4.8 cm×1.9 cm sample, a smaller 1.9 cm×1.9 cm sample of comparable thickness is used to obtain an ATR spectrum as in FIG. 2, for example, wherein the pertinent absorption bands at 1375 cm$^{-1}$ and 1540 cm$^{-1}$ are adequately defined and suitable for quantitative analysis.

In ATR spectroscopy the depth of the surface layer examined increases as the frequency of the radiation decreases. Under the conditions used in the tests reported herein, the penetration layer increased from about 0.15 millimicrons (m$\mu$) at 3800 cm$^{-1}$ to about 0.8 m$\mu$ at 880 cm$^{-1}$. Because of the reduced signal-to-noise ratio in these ATR measurements, it is necessary to open the slits of the 180 spectrophotometer by a factor of 2.4 relative to the normal or standard survey mode and to increase the span time accordingly.

A standard Perkin-Elmer 180 Recorder Console is used in combination with the 180 Monochromator to obtain the ATR infrared spectra for each sample which was then recorded on standard recording chart PR 180-2007 sold by Graphic Controls Corporation of Buffalo, N.Y. An ATR spectra on such a recording chart appears in *Rubber Chem. & Tech*, 52, 823 (1979) at page 832, and typical spectra recorded on such a chart are shown in FIG. 2 herein.

The recording chart PR 180-2007 is prepared for use with the Perkin-Elmer 180 Recorder Console and has a box at the bottom right corner for recording the relevant parameters when obtaining each infrared spectrum. In every ATR spectra obtained from tread samples according to the present specification the mode of operation as recorded on the chart PR 180-2007 is as follows: gain 5.0; scan time, fine 4, coarse 10; suppression 3; slit program 0.6 at 3800 cm$^{-1}$; time constant 1.

Figure 4:
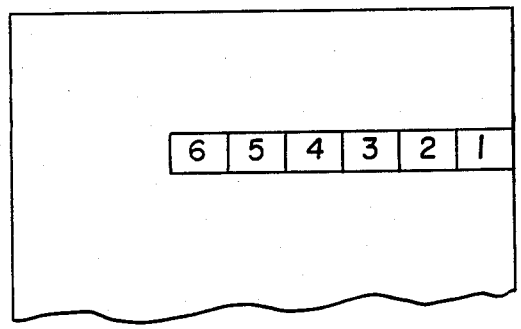
FIG. 4 is a schematic top view of a dual-layer extruded tread showing the size and location of samples cut from the surface.

The spectra recorded from samples taken as indicated in FIG. 4 are employed to determine peak heights of the pertinent absorption bands and are used for quantitative analysis of the samples based on calculated absorption band ratios.

Figure 2:
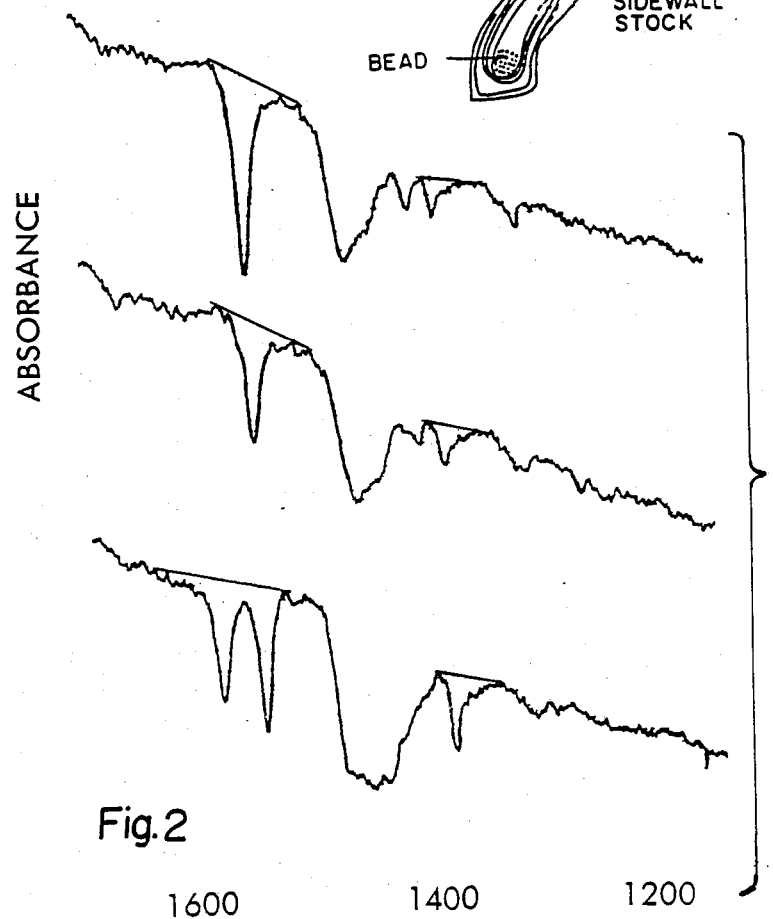
FIG. 2 shows the ATR infrared spectra for three samples of different undertreads as obtained on an infrared spectrometer including the base lines used to determine the peak heights of the pertinent absorption bands for natural rubber and for zinc and calcium salt.

The term "band ratio" as used herein refers to the ratio of the heights of peak absorption bands in an infrared spectra obtained on a conventional infrared spectrometer, and the term "base line" as used herein and in connection with FIG. 2 refers to a line drawn between points of no absorption as described in "*Applied Infrared Spectroscopy*" by A. Lee Smith, copyright 1979 by John Wiley & Sons (see pages 35,36, 84–95, 135–137, and 223–226).

The base lines are drawn in FIG. 2 to determine the peak height of the absorption bands for natural rubber at a wave length of 1375 cm$^{-1}$, for zinc stearate at about 1540 cm$^{-1}$, and for calcium stearate at about 1575 cm$^{-1}$. The absorption band ratio 1540 cm$^{-1}$/1375 cm$^{-1}$ provides a convenient estimate as to the relative content of zinc stearate and similar salts of $C_{16}$-$C_{18}$ fatty acids in the rubber samples, which are substantially free of calcium stearate as indicated by the middle and top spectra of FIG. 2. The bottom spectrum of that figure involves a sample of an undertread containing substantial amounts of calcium stearate which can be estimated in a similar manner.

For example, in the top ATR spectrum of FIG. 2, the peak height of the absorption band at 1540 cm$^{-1}$ is about 0.18 (0.46 minus 0.28), that at 1375 cm$^{-1}$ is about 0.04 (0.41 minus 0.37), and the band ratio 1540/1375 is about 5:1. In the middle spectrum of FIG. 5, the peak height at 1540 cm$^{-1}$ is about 0.1, that at 1375 cm$^{-1}$ is about 0.4, and the band ratio is about 2.6:1. In the bottom spectrum the peak height at 1575 cm$^{-1}$ is about 0.07 (0.23 minus 0.16), that at 1540 cm$^{-1}$ is about 0.09, and that at 1375 cm$^{-1}$ is about 0.05.

FIG. 4 indicates the approximate locations on the exposed surface of the undertread where six samples may be taken to estimate by ATR analysis the average surface characteristics of a given undertread. The samples are cut to the specified 1.9 cm×1.9 cm size to obtain the ATR spectra in the manner previously described.

Samples selected in this manner were used to obtain ATR infrared spectra and to calculate band-ratio data as reported in Table I herebelow:

TABLE I

| Sample Number | ATR Absorption Band Ratio $A_{1540}/A_{1375}$ | | | | | |
|---|---|---|---|---|---|---|
| | Section 1 | Section 2 | Section 3 | Section 4 | Section 6 | Avg. |
| 1 | 1.0 | 9.0 | 7.5 | 6.5 | 6.5 | 6.1 |
| 2 | 2.9 | 5.7 | 9.1 | 6.0 | 9.0 | 6.5 |
| 3 | 3.9 | 4.1 | 2.7 | 1.3 | 2.2 | 2.8 |
| 4 | 3.5 | 4.2 | 4.1 | 1.1 | 4.8 | 3.5 |
| 5 | 2.6 | 8.0 | 11.5 | 9.0 | 15.3 | 9.3 |
| 6 | 2.5 | 12.0 | 13.1 | 11.2 | 5.8 | 8.9 |

Six different undertreads were analysed by taking sections (5 of which are reported above) of the surface of each sample at six locations across the width of the undertread as in FIG. 4. The undertreads identified in the Table as samples 1, 2, 5 and 6 have average band ratios ($A_{1540}/A_{1375}$) from 6.1:1 to 9.3:1 indicating an unacceptable amount of zinc stearate at the surface whereas the two undertreads identified as samples 3 and 4 have average band ratios of 2.8:1 and 3.5:1, respectively. The improvement in these tests results from inversion of the dual-layer tread package on the conveyor belt so that the tread cap portion engages the belt instead of the undertread portion and the spray of cooling water engages the undertread instead of the tread cap.

In the prior art process the cooling water contacts one side only of the dual-layer tread (i.e., the tread cap), and the temperature gradient favors diffusion toward the undertread. By turning the tread package upside down on the conveyor belt, the temperature gradient is reversed to permit migration of undissolved zinc stearate and other zinc salts toward the tread cap, and the band ratio $A_{1540}/A_{1375}$ for an average sample of the exposed undertread surface is greatly reduced.

When manufacturing radial passenger car tires using an NR/BR/SBR undertread of the character described herein and omitting the undertread cement according to the present invention, such band ratio must be no more than 1.5:1 and is preferably much less. Stated in another way, an undertread prepared by the process of this invention contains only limited amounts of fatty acids and fatty acid salts, and an average sample of the exposed surface thereof (which is to be bonded without adhesives) should contain amounts of those salts such that the peak height of its ATR infrared absorption band at about 1540 cm$^{-1}$ is no more than about 50% greater than that for natural rubber at about 1375 cm$^{-1}$. In a typical NR/BR/SBR undertread used for radial tires and containing from 25 to 35 phr of natural rubber, said peak height at 1540 cm$^{-1}$ for an average sample is preferably not substantially greater than the peak height of the NR absorption band for that sample at 1375 cm$^{-1}$. This assures that the undertread has adequate building tack, that the number of tire defects due to tire building and tread adhesion problems when practicing this invention is minimized, and that the radial tires made according to the invention meet the highest quality and safety standards set by the industry.

The process of the present invention has special advantages in connection with factory quality control growing out of the reduction in the zinc oleate content and the zinc palmitate content, the minimization of the calcium stearate content, and the simplification of the diffusion problems, because the remaining problems of zinc stearate migration can be kept under control and conveniently monitored on a regular or routine basis by the special quantitative ATR analytical methods described above. For these and other reasons which are readily apparent, the process of the present invention produces tires of the highest quality and has proven to be a breakthrough in the assignee's tire manufacturing operations which will likely eventually result in elimination of undertread cementing operations by the tire industry.

Figure 3:
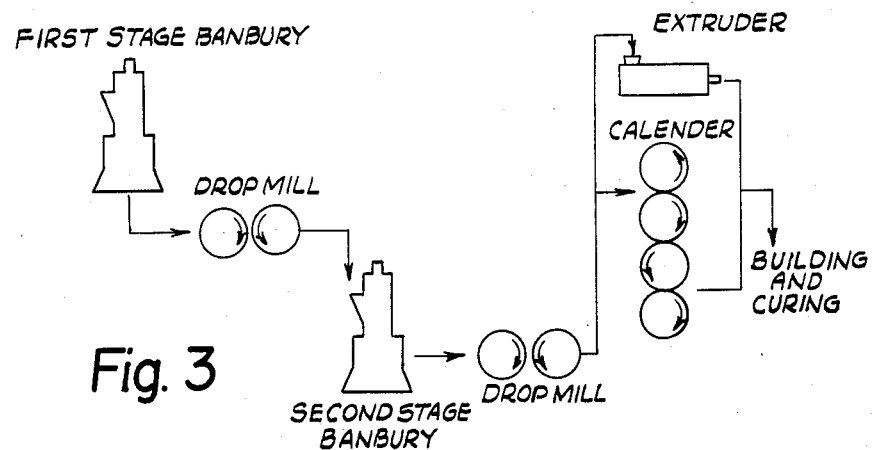
FIG. 3 is a diagrammatic view showing a conventional equipment train of the type used in a tire factory and used in the practice of this invention.

The rubber compositions used in the practice of this invention are mixed and processed in the factory using, for the most part, the standard equipment which has been used for more than a decade to manufacture radial and bias/belted passenger and truck tires. Such equipment is shown diagrammatically in FIG. 3 and includes first-stage and second-stage Banbury mixers 10 and 11 and associated dump mills 12 and 13. After mixing the rubber is cooled and then passed through an extruder 14 or a calender 15.

In the preferred process of this invention all of the ingredients of the undertread composition of Recipe No. 1, except the sulfur and accelerators, are added in the first-stage Banbury mixer 10 and the mixture is brought up to a temperature of at least 160° C. to cause reaction of the zinc oxide with essentially all of the fatty acids. The dump temperature is in the range of from about 160° C. to 180° C.

The rubber mix is then passed through a conventional dump mill 12 or passed through an extruder and cut into pellets. The rubber compound is cooled to a temperature below 70° C. and subsequently added to the Banbury mixer 11 along with sulfur and one or more accelerators and thoroughly mixed with the curatives while maintaining the temperature below 105° C.

It is important that the rubber stock be cooled to a temperature below 70° C. in a short period of time from 20 sec to 1 min and preferably in less than 40 sec after it leaves the mixer 11 and before it enters the extruder.

This can be accomplished by simple modifications of existing equipment. For example, the dump mill 13 may include a series of mills, each cooled with 25° C. water circulating at a rate of at least 60 gal/min or at least double the normal rate. Also the cooling can be speeded up by reducing the spacing between rolls from the usual 0.3 inch to 0.15 inch. The thin sheets from the mill are supported on hooks and cooled with air in the conventional manner to a temperature below 40° C. before the rubber is fed into the extruder 14.

The cooling of the rubber is important in preventing reversion of a portion of the insoluble sulfur to soluble sulfur. In order to prevent sulfur bloom, at least part of the sulfur used in the undertread compound is of the insoluble type (i.e., Crystex).

After cooling, the rubber is extruded in a conventional extruder while maintaining the rubber temperature below 120° C. The maximum surface temperature of the rubber during extrusion is preferably in the range of from 110° to 115° C.

Figure 6:
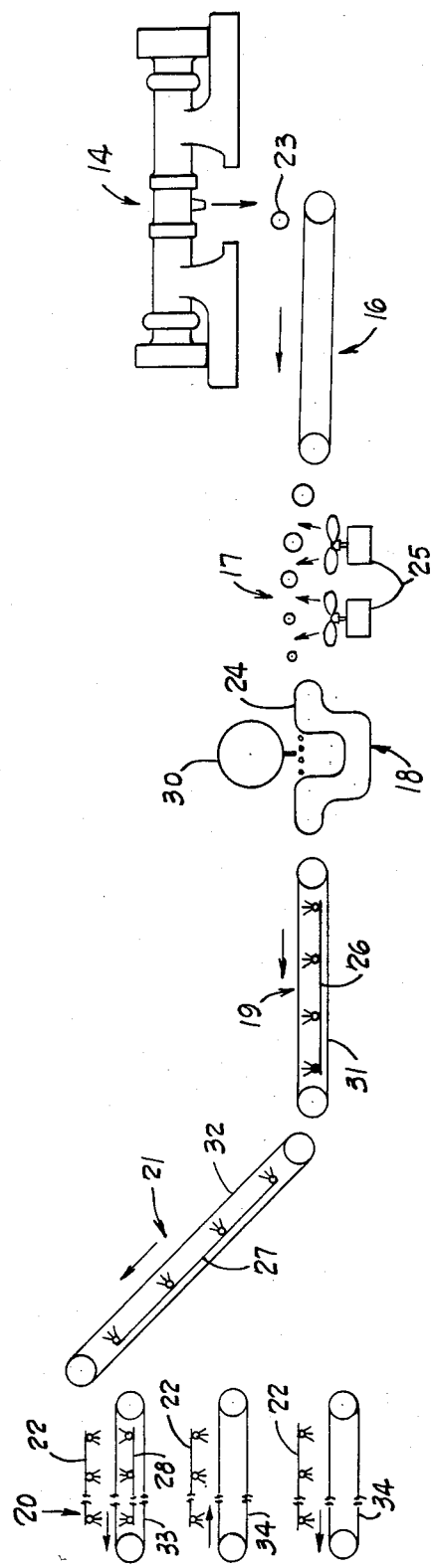
FIG. 6 is a foreshortened diagrammatic view on a reduced scale showing the equipment for conveying and cooling the extruded tread in the practice of the invention.

Various types of extruders can be used, but it is usually preferable to employ a roller-die extruder or an opposed-head plate-die extruder. The latter is shown in FIG. 6 and effects simultaneous extrusion of both the tread cap and the undertread. At the discharge end, the cap and undertread extrudates are joined to form a dual-layer tread strip. The rate of extrusion may be from 40 to 120 ft/min in conventional extruders, and the temperature of the dual-layer strip may be from 110° to 120° C.

Generally the plate die delivers the extrudate with a surface temperature somewhat higher than that of an extrudate from a roller die. When using roller dies, the surface temperature of the undertread is usually from 110° C. to 115° C. When extrusion is carried out by roller dies, the tread cap and the undertread (or base) are extruded separately and then joined together on a stitcher conveyor having a large tire-like roll to apply pressure to the cap.

FIG. 6 is a schematic view showing the type of equipment typical of that used in a tire factory in the practice of the present invention. A dual-layer tread strip is formed in the conventional opposed-head extruder 14 and discharged at a high temperature, such as 110° to 115° C., to a take-away belt conveyor 16 having a length of 30 ft or more. The belt is driven at a speed such that a tension is applied to the tread strip to stretch it as it moves under the tension roller 23 and away from the extruder 14.

The strip then moves over conventional shrink rolls 17 comprising 5 or more regularly spaced rolls of gradually decreasing diameter driven in unison and arranged with their upper surfaces defining an arcuate path. The distance across the shrink rolls may be from 14 to 16 ft in a typical installation.

The tread strip then moves directly from the shrink rolls to a weigh station 18 wherein the weight of the tread strip can be monitored. Weight control is important and a weighing scale 30 is needed to control the process. A belt conveyor 24 carries the tread strip across the scale and delivers it to a belt conveyor 19. The tread strip is then delivered to a conventional cooling tank 20 by an inclined belt conveyor 21.

Except for cooling means added according to the present invention to cool the exposed undertread surface, the units 16 through 20 are conventional and in common use in tire factories. However, prior to the present invention, a cementing station was always provided between the weigh station 18 and the inclined conveyor 21 for application of undertread cement. Heretofore the tread strip had to travel 60 ft or more from the extruder to the cementing station. The length of travel normally provides enough room for additional operations, such as tread marking, before the undertread cement is applied.

In accordance with the present invention the cementing station is omitted and the tread strip is delivered directly from the weigh station 18 to the conveyor 19 or to the conveyor 21. The length of the undertread portion of the tread strip measured from the outlet of the extruder is from 50 to 60 ft or more at the incoming end of the conveyor 19 (or 21) and from 70 to 100 ft or more at the inlet to the cooling tank 20.

Except for the addition of upwardly directed water sprays (at 28), the cooling tank is of conventional construction with belt conveyors arranged in 3 tiers and having a total length of 300 to 400 ft. A cooling tank can have a total conveyor length of from 200 to 500 ft or more, but the belt conveyor at the upper tier usually has a length from 100 to 150 ft. In the system illustrated in FIG. 6, the top conveyor of the cooling tank 20 has a total length of from 120 to 150 ft, the bottom conveyor has a length of from 40 to 60 ft, the inclined conveyor 21 has a length of from 25 to 30 ft, and the horizontal conveyor 19 has a length of from 20 to 40 ft. Of course, cooling tanks of greater capacity can also be used.

The cooling tank 20 has conventional cooling means comprising a line of spray means 22 located above each conveyor belt for directing sprays of water directly against the upper surface of the tread cap as it moves through the tank. In the conventional arrangement, the undertread travels 120 to 150 ft before it is inverted at the second tier to receive cooling water from the spray means 22. Thus the undertread travels almost 200 ft before it is subjected to rapid cooling by the water jets in a conventional factory process.

A critically important feature of the present invention is the provision of cooling means to direct cooling fluid at a temperature of from 20° to 30° C. upwardly against the exposed surface of the undertread. In order to minimize the migration of zince stearate to the undertread surface, it is necessary to initiate such cooling within 30 seconds after the rubber compound leaves the extruder.

This is accomplished by providing two pairs of cooling fans or blowers 25 which direct air vertically at high velocity through the spaces between adjacent shrink rolls at 17. The blowers of each pair are spaced laterally to provide cooling across the full width of the tread strip and are designed to provide maximum heat transfer so that the temperature of the undertread surface is lowered at least about 10° C. as it moves over the shrink rolls from the conveyor 16 to the weighing station 18. The air discharged from the blowers may be at ambient temperature and is preferably maintained at a temperature not in excess of 25° C.

The belt conveyor 19 and/or the belt conveyor 21 must be modified to effect rapid cooling of the undertread surface. This is done by providing the conveyor with an open belt having a major portion of its surface open, such as a woven-wire belt or the like, and by providing spray means to force water upwardly through large openings of the belt against the undertread surface. The arrangement is such that a major portion of the undertread surface is contacted by water sprays and the surface is cooled at a rate of from 1.5° to 2° C./sec.

FIG. 6 indicates diagrammatically where the water sprays may be located at the conveyors 19 and 21 and at the top conveyor of the cooling tank 20. As shown the conveyor 19 has a line of spray means 26 located below the upper section of a wire-mesh belt 31 and the inclined conveyor 21 has a similar line of spray means 27 located under the upper section of the wire-mesh belt 32.

The cooling tank is modified by replacing the conventional belt of the upper tier with an open plastic belt 33 with a weight comparable to that of a normal belt or such as to permit use of the normal drive means. The plastic belt has large openings that permit water sprays to contact most of the undertread surface. A line of spray means 28 is provided below the upper portion of the belt 33 to effect cooling at a high rate in excess of 1° C./sec. The sprays may be spaced 2 or 3 ft apart along the length of the belt to effect cooling of the undertread surface at a rate of from 1.0° to 1.5° C./sec or higher.

The spacing of the sprays 22 along the length of the upper and middle conveyors of the cooling tank is usually about one foot or so. The spacing of the sprays 26 and 27 along the length of the belts 31 and 32 is preferably from 1 to 2 ft, and the spray means can effect cooling at a rate of from 1.5° to 2° C. per sec when the tread strip is traveling at a velocity of from 90 to 100 ft/min. Spray means similar to the spray means 22 may be provided above the conveyors 19 and 21, to cool the tread cap. However, such additional cooling is not necessary to control zinc stearate bloom and is not important in the practice of this invention.

Although the rate of heat transfer achieved by water sprays can be many times that achieved by convection air cooling, the air cooling is a convenient and remarkably effective way to slow down diffusion of zinc stearate toward the undertread.

The amount of heat transfer can be estimated from the equation $q = hA(t_2 - t_1)$, where h is the thermal conductivity, $\underline{A}$ is the surface area, and t is the temperature. In the practice of this invention the fans move the air against the undertread at such a velocity that the thermal coductivity h is greater than 4 and usually about 5 Btu/hr/ft²/° F. The water sprays at conveyors 21 and 22 direct the water directly against the undertread and preferably provide a thermal conductivity h from 35 to 50 Btu/hr/ft²/°F. so that the surface of the rubber is cooled at a high rate in excess of one degree Celsius per second.

The fans at the shrink rolls 17 preferably have a cooling capacity such that the undertread surface of a radial passenger tread strip can be cooled to a temperature at least 10° C. less than that of the opposing tread cap surface as those surfaces move over the shrink rolls. This provides a temperature gradient favoring migration of zinc stearate away from the undertread surface toward the tread cap surface and reducing the concentration of zinc stearate in the undertread.

The surface temperature at various points on the undertread and the tread cap portions of the tread can readily be monitored using a conventional infrared gun. It will be understood that, unless the context shows otherwise, any reference to the difference between the temperature of the undertread surface and that of the tread cap surface or that of the hottest interior portion of the tread has its logical and normally accepted meaning and refers to a temperature difference at a given lateral cross-section of the tread strip.

The process of the present invention is particularly well suited for manufacture of standard steel-belted radial passenger car tires, such as those of the character shown schematically in FIG. 1 or in *Rubber Chem & Tech*, 53 848 at page 852. Such a tire has a synthetic rubber tread cap, such as a 70/30 or 60/40 SBR/BR blend with a 300% modulus of about 1300 to 1400 psi and an oil content of from 25 to 35 phr, an undertread comprising an NR/BR/SBR blend with a 300% modulus of about 1100 psi, an NR-based belt compound with a 300% modulus of about 2200 to 2400 psi and a tensile strength of at least 3000 psi, and a sidewall stock comprising an NR/BR blend with a 300% modulus of about 800 psi. The undertread composition employed in tires made by the present invention may, for example, be a 30/50/20 NR/BR/SBR blend having the physical properties sought in modern radial tires.

The recipes set forth below are examples of the type of undertread and belt compounds which can be employed in the practice of this invention for manufacture of steel-belted radial passenger car tires and the like. It will be understood that the treads of such tires are preferably spliced using tread splice cements as disclosed in my copending U.S. patent application Ser. No. 581,512, now U.S. Pat. No. 4,539,365. Amounts given are parts by weight.

| Recipe No. 1 - Undertread Compound | |
|---|---|
| Cis-BR Rubber (35-45 Mooney) | 50-55 |
| Natural Rubber (1.5% fatty acids) | 28-30 |
| SBR Rubber (4.5% fatty acids) | 18-22 |
| GPF Carbon Black (N660) | 55-60 |
| Aromatic processing oil | 15 |
| t-octylphenol-formaldehyde resin | 2.0 |
| Polymeric dihydroquinoline(ARRD) | 2.4 |
| N,N'—di(sec-octyl)-p-phenylenediamine | 1.8 |
| Zinc oxide | 3-3.5 |
| Fatty acid (70% stearic, 20-25% palmitic) | 1.4 |
| Cyclohexyl-n-thiophthalimide | 0.15 |
| Insoluble sulfur | 1.8 |
| Sulfenamide accelerator | 1.3-1.5 |

| Recipe No. 2 - Belt Compound | |
|---|---|
| Natural rubber (smoked sheets) | 100 |
| HAF carbon black | 50-60 |
| Aromatic processing oil | 5-6 |
| Zinc oxide | 8-10 |
| Stearic acid (70% Stearic, 20-25% palmitic) | 1-1.5 |
| t-octylphenol-formaldehyde resin | 1.2 |
| Polymeric dihydroquinoline (ARRD) | 2.5 |
| Cobalt stearate | 1.0 |
| N,N'—di(sec-octyl)-p-phenylenediamine | 1.0 |
| Litharge | 1.0 |
| Cyclohexyl-n-thiophthalimide | 0.3 |
| Insoluble sulfur | 4-5 |
| Sulfenamide Acccelerator | 1-1.5 |

The belt compound of Recipe No. 2 may be prepared using a standard three-stage Banbury mixing process wherein the curatives are added in the final stage. The addition of zinc oxide and fatty acid is split between the first and second stage mixes.

The dump temperature at the end of the final Banbury mixing stage is not in excess of 105° C. The mix is cooled to a temperature below 70° C. in less than 30 sec after termination of the final-stage mixing. Thereafter the belt compound is passed through a breakdown mill at a temperature below 80° C. and a strip mill at a temperature below 95° C. to a 4-roll calender where the temperature of the compound is maintained below 110° C. The compound is cooled to a temperature below 40° C. in less than 1 min after calendering.

It will be understood that advantages of this invention can be obtained using conventional belt compounds, such as those disclosed in U.S. Pat. No. 4,068,041 or others commonly used in modern radial tires, and that conventional sidewall compositions can be employed if proper precautions are taken to maintain the necessary building tack.

Tires manufactured according to this invention are at least equal in quality and usually superior to those produced using undertread cements because of the great improvement in tack retention. They can be operated at high speeds under severe conditions for more than 40,000 miles to the point of failure with no problems due to tread separation or poor adhesion. The elimination of the tread cement has no adverse effect on tire uniformity or tire quality and provides an excellent solution to chronic factory tack problems which heretofore troubled the tire industry.

The invention is of great importance, not only because of the great monetary savings resulting from omission of the undertread cement and reduction in waste, but also because of the ecological value in eliminating health and safety problems due to the use of hydrocarbon solvents.

I claim:

1. In a mass production process for manufacturing belted pneumatic rubber tires having a plurality of circumferential belts and a dual-layer tread including an undertread and tread cap extending around the belts and spliced at the tread's ends, in which the undertread comprises a major amount of styrene-butadiene-rubber (SBR) and polybutadiene rubber (BR) having a cis-1,4 content of from 90 to 99%, and a minor amount of natural rubber (NR) are mixed with reinforcing carbon black, processing oil, tackifying resin, antidegradants, fatty acids, zinc oxide, sulfur and accelerator in first-stage and second-stage Banbury mixers to form a vulcanizable undertread composition which is then passed through an extruder and joined to said tread cap which is extruded from a blend of 50 to 70 parts SBR and 30–50 parts BR to form said dual-layer tread, the improvement which comprises, (a) providing said undertread composition with from 10 to 35 parts of SBR and from 40 to 60 parts of polybutadiene rubber and 25 to 40 parts of natural rubber per 100 parts by wt of rubber in said undertread composition;

(b) adding to the composition in the first-stage Banbury mixer from 4 to 10 parts of a mixture of a phenolic tackifying resin, a polymeric trimethyl dihydroquinoline, and a N,N'-disubstituted paraphenylenediamine, each being present in a ratio of from about 1:1 to about 3:1 relative to each of the others of said added constituents, said tackifying resin being made from an alkylated phenol substituted in the para position with a tertiary alkyl group having from 4 to about 18 carbon atoms and having a molecular weight from 700 to 1500, said diamine being selected from N,N'-dialkyl-p-phenylenediamine, N-alkyl-N'-phenyl-p-phenylenediamine and mixtures thereof, the alkyl having from 4 to about 18 carbon atoms;

(c) adding to the composition in the first-stage mixer from 2 to 5 parts of zinc oxide and from about 1 part to about 2 parts of a fatty acid mixture containing from 60 to 90% by wt of stearic acid, up to 40% by wt of palmitic acid, so that the mixture provides less than 0.1 phr of oleic acid;

(d) heating the composition in said first-stage mixer to a temperature of from about 160° C. to about 180° C. sufficient to cause the zinc oxide to react with essentially all of the fatty acids, dumping the hot composition and transferring it to the second-stage mixer for further mixing;

(e) cooling the undertread composition to a temperature below 70° C. in less than 1 minute after it leaves the second stage Banbury mixer and before it enters the extruder;

(f) limiting the temperature of the composition in the extruder to a maximum in the range of from about 100° C. to about 120° C.;

(g) providing a cooling zone in which a cooling fluid at a temperature of from 20° to 30° C. is brought into direct contact with the exposed surface of the undertread after extrusion to cool each portion of said surface to a temperature below 40° C. in no more than 1 minute after it leaves the extruder; and (h) controlling the rate of extrusion and the speed of movement of the dual-layer tread to cause each portion of said exposed surface to arrive at said cooling zone in no more than 40 seconds after leaving the extruder, whereby said exposed surface retains building tack and said tires may be mass reduced with adhesive-free bonding of the undertread to the outermost circumferential belt.

2. A process for manufacturing tires according to claim 1 wherein each portion of said exposed surface of said undertread is cooled by causing impact of a cooling fluid against said surface in no more than 30 seconds after that portion leaves the extruder, and the temperature of said portion is maintained below the surface temperature of the tread cap in said cooling zone.

3. A process for manufacturing tires according to claim 1 wherein an average sample of the exposed undertread surface contains amounts of fatty acids and fatty acid salts so limited that the peak height of the ATR infrared absorption band at a wave number of about 1540 $cm^{-1}$ as determined from said sample on an infrared spectrometer is no more than about 50 percent greater than that for natural rubber at a wave number of about 1375 $cm^{-1}$.

4. A process according to claim 3 wherein said extruded undertread contains zinc oleate, zinc palmitate and zinc stearate, the total amount by weight of zinc stearate being substantially greater than that of zinc palmitate and at least several times that of zinc oleate.

5. A process for manufacturing belted pneumatic rubber tires according to claim 3 wherein said undertread composition contains from 25 to 35 parts of natural rubber, from 45 to 55 parts of cis-BR, from 15 to 25 parts of SBR, from 1 to 3 parts of a para-t-alkylphenol-formaldehyde tackifying resin with a molecular weight from about 700 to about 1500, and from about 0.1 to about 0.2 parts of cyclohexyl-n-thiophthalimide, and wherein the NR, BR and SBR rubber added to said composition initially contain no more than 2 phr of saturated fatty acids with up to 16 carbon atoms and no more than 0.1 phr of unsaturated fatty acids with 18 carbon atoms.

6. A process according to claim 5 wherein the peak height of the ATR infrared absorption band of said average sample at about 1540 $cm^{-1}$ is not substantially greater than that at about 1375 $cm^{-1}$.

7. A process for manufacturing tires according to claim 1 in which a belt conveyor receives the dual-layer tread from the extruder and delivers it to shrink rolls comprising a series of spaced parallel rolls of gradually decreasing diameter arranged to move the tread in an arched path, said tread being stretched by said conveyor as it leaves the extruder, and in which blower means forces air between successive shrink rolls and causes the air to impact against the exposed bottom surface of the tread along the length thereto to cool each portion of said exposed surface to a temperature at least 10° C. less than that of the tread cap surface and to permit migration of zinc stearate from the undertread toward the latter surface.

8. In a mass production process for manufacturing belted pneumatic rubber tires having a plurality of circumferential belts and a dual-layer tread including an undertread and tread cap extending around the belts and spliced at the tread's ends, in which the undertread comprises a major amount of styrene-butadiene-rubber (SBR) and polybutadiene rubber (BR) having a cis-1,4 content of from 90 to 99%, and a minor amount of natural rubber are mixed with reinforcing carbon black, processing oil, tackifying resin, antidegradants, fatty acids, zinc oxide, sulfur and accelerator in first-stage and second-stage Banbury mixers to form a vulcanizable undertread composition which is then passed through an extruder and joined to said tread cap to form a continuous dual-layer tread strip and in which said strip is fed by a belt conveyor at a rate of at least 60 ft/min over shrink rolls past a weigh station to a belt conveyor and thereafter cooled by water sprays as it moves more than 200 ft through a cooling tank, the length of the undertread measured from the extruder being greater than 50 ft at the incoming end of said last-named conveyor and at least 70 ft at the inlet to said cooling tank, the improvement which comprises, (a) providing said undertread composition with from 10 to 35 parts of SBR and from 40 to 60 parts of polybutadiene rubber and 25 to 40 parts of natural rubber per 100 parts by wt of rubber in said undertread composition;

(b) adding to the composition in the first-stage Banbury mixer from 4 to 10 parts of a mixture of a phenolic tackifying resin, a polymeric trimethyl dihydroquinoline, and a N,N'-disubstituted paraphenylenediamine, each being present in a ratio of from about 1:1 to about 3:1 relative to each of the other of said added constituents, said tackifying resin being made from an alkylated phenol substituted in the para position with a tertiary alkyl group having from 4 to about 18 carbon atoms and having a molecular weight from 700 to 1500, said diamine being selected from N,N'-dialkyl-p-phenylenediamine, N-alkyl-N'-phenyl-p-phenylenediamine and mixtures thereof, the alkyl having from 4 to about 18 carbon atoms;

(c) adding to the composition in the first-stage mixer from 2 to 5 parts of zinc oxide and from about 1 part to about 2 parts of a fatty acid mixture containing from 60 to 90% by wt of stearic acid;

(d) heating the composition in said first-stage mixer to a temperature of from about 160° C. to about 180° C. sufficient to cause the zinc oxide to react with essentially all of the fatty acids, dumping the hot composition and transferring it to the second-stage mixer for further mixing;

(e) discharging the tread strip from the extruder at a velocity of at least 90 ft/min while maintaining the surface temperature of the strip below 115° C.;

(f) providing blower means below the shrink rolls and causing air to impact against the exposed undertread surface to reduce the surface temperature at least about 10° C.; and, (g) providing a cooling zone between said weigh station and said cooling tank in which water sprays are directed against the exposed undertread surface to cause rapid cooling thereof for at least 10 sec at a rate of at least 1° C. per sec before the tread strip enters the cooling tank, (h) applying the tread strip of step (g) to the carcass of a tire.

9. A process for manufacturing steel-belted radial tires according to claim 1 having a belt compound with a 300% modulus of from 2200 to 2500 psi wherein said belt compound is prepared by mixing 100 parts by wt of NR with from 50 to 70 parts of a fine high abrasion carbon black, from 1 to 15 parts of oil, from 7 to 10 parts of zinc oxide, and from 2 to 7 parts of insoluble sulfur in first-stage and final-stage Banbury mixers and is then passed through a calender and applied to wires to form a rubber-coated wire belt and in which the belt compound is maintained at a temperature below 105° C. in said final-stage mixer and is maintained below 115° C. in said calender.

10. A process according to claim 9 wherein said belt compound is cooled to a temperature below 70° C. within a period in the range from about 10 sec to 30 sec after termination of the final-stage mixing and is cooled to a temperature below 40° C. within a period in the range from about 10 sec to 1 min after calendering.

* * * * *